UNITED STATES PATENT OFFICE.

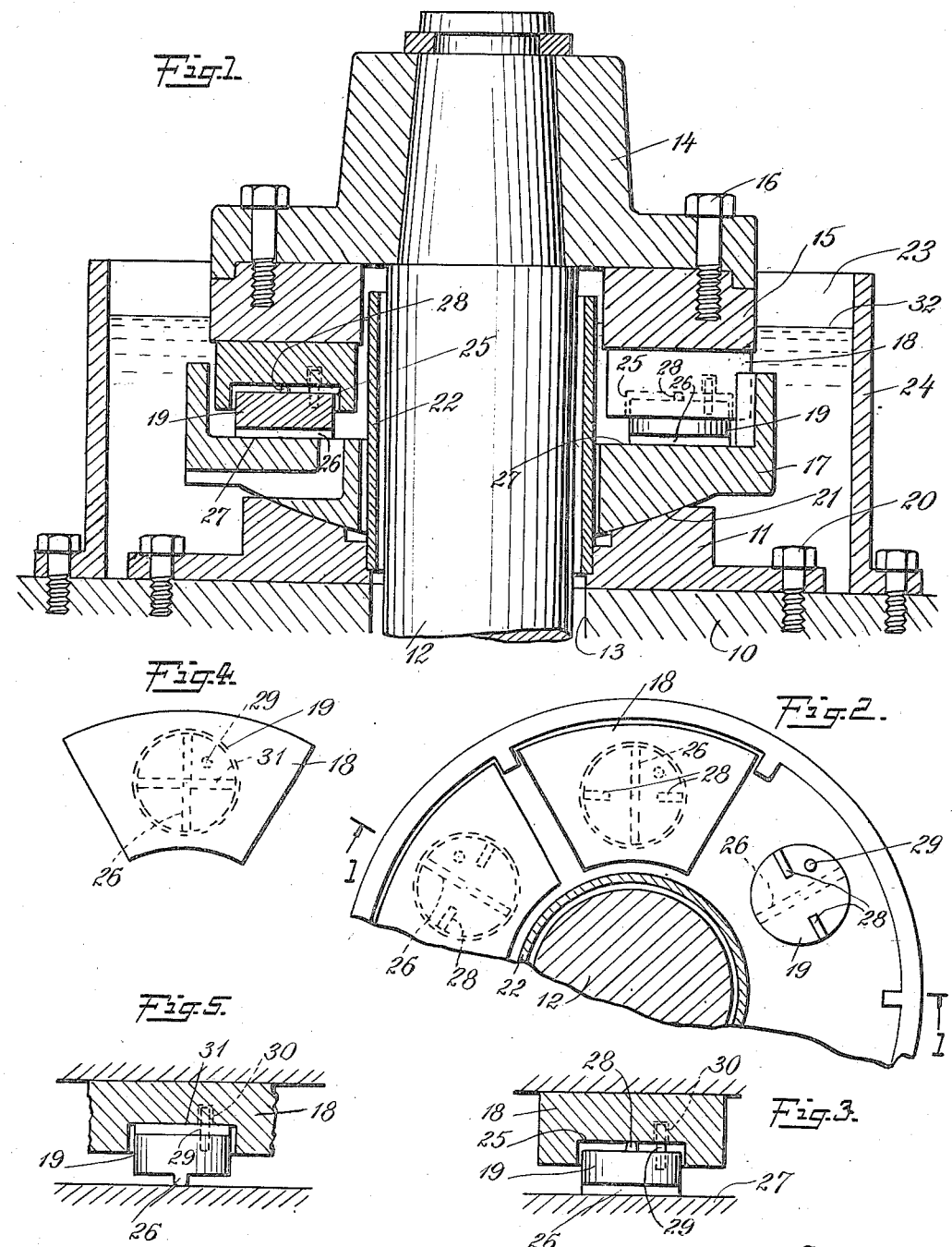

HARRY A. S. HOWARTH, OF PITTSBURGH, PENNSYLVANIA, ASSIGNOR TO ALBERT KINGSBURY, OF PITTSBURGH, PENNSYLVANIA.

BEARING.

1,390,130.   Specification of Letters Patent.   Patented Sept. 6, 1921.

Application filed November 17, 1917. Serial No. 202,446.

*To all whom it may concern:*

Be it known that I, HARRY A. S. HOWARTH, a citizen of the United States of America, and a resident of Pittsburgh, county of Allegheny, and State of Pennsylvania, have invented certain new and useful Improvements in Bearings, of which the following is a specification, reference being had to the accompanying drawings, forming a part thereof.

My invention relates to bearings and particularly to thrust bearings comprising a plurality of tiltably mounted shoes adapted for supporting heavy loads.

When thrust bearings of the shoe type have the respective shoes mounted on a single point or ball pivot so that they are free to tilt both radially and tangentially or circumferentially with respect to the axis of the bearing, it is evident that the pressure is concentrated at the pivot and it has been practically necessary to use hardened materials in order to prevent abnormal wear and friction at this point.

One object of my invention is to provide interposed means of improved construction between a bearing shoe of the aforesaid character and its support that shall enable the shoe to tilt in both radial and tangential or circumferential directions with respect to the axis of the bearing, but which nevertheless avoids concentration of load and pressure on a point or ball pivot.

A further object is to support the shoe so as to overcome to a considerable degree the tendency of the bearing surface to become crowned or bent under operating conditions.

In order that my invention may be thoroughly understood I will now proceed to describe the same in the following specification, by reference to one embodiment thereof, and then point out the novel features thereof in appended claims.

The invention, however, is capable of receiving a variety of mechanical expressions and it is to be understood that the embodiment described has been selected for purposes of illustration only, and is not to be construed as a definition of the limits of the invention, reference being had to the appended claims for that purpose.

Referring to the drawings:

Figure 1 is a sectional elevation of a thrust bearing constituting an embodiment of my invention, and taken on the line 1—1 of Fig. 2.

Fig. 2 is a partially sectional plan view of the same bearing.

Fig. 3 is a radial section showing a single shoe and its supporting block in detail.

Fig. 4 is a plan view of a single shoe, having a modified support which also embodies my invention, and Fig. 5 is a detail sectional view of the construction shown in Fig. 4.

The structure shown in Figs. 1, 2 and 3, comprises a bed plate 10 on which a base ring 11 is mounted, a shaft 12 which extends through an opening 13 in the bed plate, a thrust block 14 affixed to the shaft at its upper end, a bearing ring 15 secured by bolts 16 to the thrust block, a leveling ring or collar 17 and a plurality of bearing shoes 18 severally supported on blocks 19.

The base ring 11 may be conveniently secured to the bed plate by bolts 20 and is shown as having a spherically curved surface 21 on which the leveling ring 17 is mounted. A sleeve 22 is attached to the base ring 11 and fits loosely around the shaft 12, forming the inner wall of an annular oil reservoir 23 which is completed by an outer wall or flange 24.

In the form shown, each of the bearing shoes 18 has a cylindrical recess or hole 25 in its bottom or rear surface into which its supporting or pivot block 19 extends. The supporting block 19, also cylindrical, has a downwardly extending projection or rib 26 forming a knife-edge or rocking bearing which rests upon the top surface 27 of the leveling ring 17 and upwardly extending projections or ribs 28 which together constitute a knife-edge or rocking bearing for the shoe.

The projections 28 are preferably in alinement and at right angles to the plane of the projection 26 on the bottom surface of the block.

In the form shown, the block is also provided with an upwardly extending dowel pin 29, which fits loosely into a suitable hole 30 in the shoe and holds the block from turning without interfering with the proper relative movement between said parts when the bearing is in operation.

The knife edge projections 28 may be replaced, if desired, by a single knife edge projection 31, as shown in Figs. 4 and 5, but I prefer to omit the central part of the knife-edge projection on the top of the block in order to support the shoe 18 at a pair of spaced points, which assists materially in overcoming the tendency for the shoe to bend or crown when the bearing is in operation and insures a distribution of the load between two separated bearing projections even though the block tends to bend over the opposite right-angularly-extending knife-edge.

The arrangement of parts is such that each of the blocks 19 provides a knife edge or rocking support 28 preferably arranged as shown in Fig. 2, to permit the tilting of the shoe in a radial direction with respect to the axis of the bearing. The downwardly extending knife edge projection 26 which preferably extends in a radial direction enables the shoe and the block to tilt together in a tangential or circumferential direction with respect to the axis of the bearing. Thus the shoes are adapted to coöperate properly with the bearing surface of the thrust collar 15 even though the latter is distorted to a greater or less degree by the heating of the bearing in operation. Furthermore, the shoes are adapted to tilt about a radial axis so as to automatically establish a lubricating film between the bearing surfaces due to the wedging action of the oil when the bearing is in operation.

The oil level in the reservoir 23 is preferably maintained substantially as shown at 32 in Fig. 1, so that the bearing surfaces are flooded.

The knife edge projection for supporting the shoe may be a part of the shoe, if desired, instead of a part of the block on which the shoe is mounted, and the knife-edge projection for supporting the block may be a part of the leveling ring, if desired, instead of a part of the block so far as certain features of my invention are concerned, but there is a marked advantage in having the knife edge projections on opposite surfaces of the block and at right angles to each other, so that the shoe is mounted to tilt in all directions irrespective of the direction of the knife-edge projections with relation to a radius of the bearing, i. e. irrespective of any rotation of a block about its own axis. A dowel pin such as 29 may be used, as described, to hold the block in the position shown in Fig. 2, since in this position the shoe is best held against distortion, but the dowel pin may be otherwise located or the block may be maintained in a position at right angles to that shown in Fig. 2 without departing from the spirit of my invention. Nevertheless, if the block is provided with knife edge projections on opposite sides and extending at right angles as above described, the dowel pin or similar means for preventing the turning of the block is unnecessary, as the shoe may tilt both radially and circumferentially with respect to the axis of the bearing whatever may be the position of the projections with respect to the shoe and leveling ring.

With the construction shown in Fig. 5, if the dowel pin is omitted the arrangement has the advantage that the blocks are reversible as well as interchangeable.

While the ribs or projections on the blocks 19 have been referred to as "knife-edge" bearings or supports, it is to be understood that they need not have true knife-edges, but may have rounded or curved engaging surfaces as shown, or any other suitable formation, so long as they provide an elongated or distributed line of bearing contact. The term is therefore to be construed as generic to rocking bearings having an elongated or distributed line of bearing contact of any suitable construction.

While the construction shown and described is simple and effective and has many manufacturing and functional advantages, it is to be understood that the invention is not limited thereto, as the same is capable of receiving a variety of mechanical expressions, some of which will readily suggest themselves to those skilled in the art, while certain features thereof are capable of use without other features thereof. Reference is therefore to be had to the appended claims for a definition of the limits of the invention.

What I claim is:

1. A thrust bearing comprising a base, a bearing member, and an interposed pivot block constructed to permit tilting movement in one plane between the base and the block and tilting movement in a cross plane between the block and the bearing member.

2. A thrust bearing comprising a base, a bearing member, and an interposed pivot block constructed to permit tilting movement circumferentially of the axis of the bearing between the base and the block and a tilting movement radially of the axis of the bearing between the block and the bearing member.

3. A thrust bearing comprising a base, a bearing member, and an interposed block having a knife edge support on which the bearing member may tilt in one plane, and a knife-edge support on which the block may tilt on the base in a cross plane.

4. A thrust bearing comprising a bearing member, a supporting block having a knife edge support for the bearing member arranged to permit the bearing member to tilt radially of the axis of the bearing, and means for supporting the block to permit it to tilt circumferentially of the axis of the bearing.

5. A thrust bearing comprising a base, a bearing member, and an interposed block having a knife edge support for the bearing member arranged to permit the bearing member to tilt radially of the axis of the bearing, and a knife edge support on which the block may tilt on the base cicumferentially of the axis of the bearing.

6. A thrust bearing comprising a bearing member, and a supporting block therefor, one of said parts having spaced projections arranged to permit tilting movement between the parts in one direction.

7. A thrust bearing comprising a bearing member, and a supporting block having spaced projections or ribs constituting a knife edge support for the bearing member.

8. A thrust bearing comprising a base, a bearing member, and an interposed block having spaced projections or ribs constituting a knife edge support for the bearing member and a knife edge projection engaging the base and extending at an angle to said first-mentioned knife-edge support.

9. A thrust bearing comprising a bearing member having a recessed back surface, a supporting block extending into the recess of the bearing member and having a knife edge support for the bearing member, and means for supporting the block to tilt about an axis at an angle to the knife edge support.

10. A thrust bearing comprising a bearing member having a recessed back surface, a supporting block extending into the recess of the bearing member and having spaced projections or ribs constituting a knife edge support for the bearing member, and means for supporting the block to tilt about an axis at an angle to the knife-edge support.

11. A thrust bearing comprising a plurality of bearing shoes having recessed back surfaces, a supporting block extending into the recess of each bearing member, a knife edge support between each bearing member and its block, and means for supporting each block to tilt about an axis at an angle to the corresponding knife-edge support.

12. A thrust bearing comprising a plurality of bearing shoes having recessed back surfaces, a supporting block extending into the recess of each bearing member, spaced projections in alinement constituting a knife edge support between each bearing member and its block, and means for supporting each block to tilt about an axis at an angle to the corresponding knife-edge support.

13. A thrust bearing comprising a bearing member and a supporting block, a projection on one of said parts coöperating with the other and arranged to permit said bearing member to tilt radially of the axis of the bearing, and means for supporting the block to permit it to tilt circumferentially of the axis of the bearing.

14. A thrust bearing comprising a bearing shoe and a supporting block therefor having thereon knife edge projections on its opposite sides extending at an angle to each other.

15. A thrust bearing comprising a bearing shoe and a supporting block therefor having knife edge supports on its opposite sides extending at an angle to each other, one of said knife-edge supports being composed of alined peripherally-positioned projections.

16. A thrust bearing comprising a bearing shoe and a supporting block therefor, one of said parts being recessed to receive the other and said block having knife edge projections on its opposite sides extending at an angle to each other.

17. A thrust bearing comprising a bearing shoe having a recess in its bottom surface, and a supporting block fitted loosely into the recess and having knife edge projections on its opposite sides extending at right angles to each other.

18. A thrust bearing comprising a bearing shoe and a supporting block therefor, said block having knife-edge supports on its opposite sides extending at an angle to each other, the knife-edge support engaging said shoe being composed of alined, peripherally-positioned projections.

19. A thrust bearing comprising relatively rotatable members including a bearing shoe, and means tiltably mounting said bearing shoe comprising spaced elongated projections constituting an interrupted knife-edge support therefor.

20. A thrust bearing comprising a bearing shoe and a supporting block therefor having an interrupted knife-edge support on one side and a right-angularly extending knife-edge support on the opposite side.

21. A thrust bearing comprising relatively rotatable members and including a bearing shoe, a supporting block, an interrupted knife-edge support between said bearing shoe and block, and a right-angularly extending knife-edge support between said block and one of said members.

22. A bearing comprising a supporting member, a bearing member, and an interposed pivot block having a rocking bearing portion on one side on which the bearing member may tilt in one direction and a rocking bearing portion on its opposite side on which the block and bearing member may tilt in a direction at an angle to said first direction.

23. A bearing comprising a supporting member, a bearing member, and an interposed pivot block having a rocking bearing portion on one side on which the bearing member may tilt radially of the axis of the bearing and a rocking bearing portion on its opposite side on which the block and bearing member may tilt circumferentially of the axis of the bearing.

24. A bearing comprising a bearing shoe, a supporting block therefor, and rocking bearing portions on the opposite sides of said block extending at an angle to each other, one of said bearing portions being composed of spaced, alined projections.

25. A bearing comprising a bearing shoe, a supporting block therefor, and rocking bearing portions on the opposite sides of said block extending at an angle to each other, the bearing portion between the bearing block and shoe being composed of spaced, alined projections.

26. A bearing comprising a bearing shoe and a supporting block therefor, said block being constructed to provide rocking bearing portions on its opposite sides extending at right angles to each other.

27. A bearing comprising a base member, a bearing member, and an interposed block provided with rocking bearing portions which have substantially line-contact engagement with said members respectively.

28. A bearing comprising a base member, a bearing member, and an interposed block provided with rocking bearing portions which have substantially line-contact engagement with said members respectively, said bearing portions extending at substantially right angles to each other.

In witness whereof, I have hereunto set my hand this 9th day of November, 1917.

HARRY A. S. HOWARTH.